US007867554B2

(12) United States Patent
Kmetz

(10) Patent No.: US 7,867,554 B2
(45) Date of Patent: Jan. 11, 2011

(54) BORON NITRIDE COATED FIBERS AND COMPOSITE ARTICLES CONTAINING SAME

(75) Inventor: Michael A. Kmetz, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 1191 days.

(21) Appl. No.: 11/030,672

(22) Filed: Jan. 6, 2005

(65) Prior Publication Data
US 2006/0147692 A1 Jul. 6, 2006

(51) Int. Cl.
*B65B 33/00* (2006.01)
*C23C 16/00* (2006.01)
(52) U.S. Cl. .................. 427/154; 427/215; 427/249.5
(58) Field of Classification Search ............... 428/292.1
See application file for complete search history.

(56) References Cited

U.S. PATENT DOCUMENTS

| 4,642,271 | A | | 2/1987 | Rice |
| 4,752,503 | A | | 6/1988 | Thebault |
| 4,970,095 | A | | 11/1990 | Bolt et al. |
| 5,021,367 | A | | 6/1991 | Singh et al. |
| 5,389,450 | A | * | 2/1995 | Kennedy et al. ............ 428/552 |
| 5,407,740 | A | * | 4/1995 | Jessen .................... 428/300.1 |
| 5,643,514 | A | | 7/1997 | Chwastiak et al. |
| 6,040,008 | A | | 3/2000 | Sacks |
| 6,203,904 | B1 | | 3/2001 | Sacks |
| 6,284,358 | B1 | | 9/2001 | Parlier et al. |
| 6,670,026 | B2 | * | 12/2003 | Steibel et al. ............ 428/293.4 |

FOREIGN PATENT DOCUMENTS

| EP | 0 564 245 A | 10/1993 |
| GB | 2 236 540 A | 4/1991 |

OTHER PUBLICATIONS

Patibandla, N., and Luthra, K. L., *Chemical Vapor Deposition of Boron Nitride*, J. Electrochem. Soc., vol. 139, No. 12, pp. 3558-3565 (1992).
Gebhardt, J. J., *CVD Boron Nitride Infiltration of Fibrous Structures: Properties of Low Temperature Deposits*, Proceeding of the 4th International Conference on Chemical Vapor Deposition, The Electrochem. Soc., Princeton, NJ, pp. 460-472, 3R (1973).

(Continued)

*Primary Examiner*—D. Lawrence Tarazano
*Assistant Examiner*—Camie S Thompson
(74) *Attorney, Agent, or Firm*—Carlson, Gaskey & Olds PC

(57) ABSTRACT

Boron nitride coated fibers, and composite articles comprising such fibers, are described herein. These fibers can be desized and coated in one continuous process, without requiring purging in between processing steps. The fibers may be heated up in an ammonia atmosphere, and then be contacted with a reaction mixture, which comprises a boron source and a nitrogen source. Once coated, the fibers may be utilized in a ceramic matrix composite.

21 Claims, 2 Drawing Sheets

OTHER PUBLICATIONS

Lee, W. Y., et al., *Kinetic Analysis of Chemical Vapor Deposition of Boron Nitride*, J. Am. Cer. Soc., 74 [10], pp. 2642-2648 (1991).
Matsuda, T., *Stability to Moisture for Chemically Vapor-Deposited Boron Nitride*, J. Mater. Sci., 24, pp. 2353-2358 (1989).
Naslain, O. D., and Guette, A., *Boron Nitride Interphase in Ceramic-Matrix Comoposites*, J. Am. Cer. Soc., 74 [10], pp. 2482-2488 (1991).

Pippel E et al: "CVD-coated boron nitride on continuous silicon carbide fibres: structure and nanocomposition" Journal of the European Ceramic Society, Elsevier Science Publishers, Barking, Essex, GB. vol. 20, No. 11, Oct. 2000 pp. 1837-1844, XP004214289 ISSN; 0955-2219.

European Search Report Dated Apr. 13, 2006.

* cited by examiner

BORON NITRIDE COATED FIBERS AND COMPOSITE ARTICLES CONTAINING SAME

FIELD OF THE INVENTION

The present invention relates generally to ceramic matrix composites, and more specifically, to ceramic matrix composites incorporating boron nitride coated reinforcement fibers therein.

BACKGROUND OF THE INVENTION

Ceramic matrix composites (CMCs) have attracted significant interest for various aircraft and power generation applications due to their high toughnesses and their ability to avoid catastrophic failure when their maximum load carrying capability has been exceeded. CMCs are also much lighter and have higher temperature capabilities than the superalloys currently used for many gas turbine engine components, making CMCs particularly attractive for aerospace applications. CMCs generally comprise three components: a ceramic matrix, reinforcing fibers embedded within the ceramic matrix, and an interfacial coating on the reinforcing fibers. The high toughness of CMCs is due to the weak or limited bonding that occurs between the fibers and the surrounding matrix, which allows the fibers to pull out of the matrix instead of causing a catastrophic failure. Interfacial coatings are often applied to such fibers to control the chemical and mechanical interfacial bonding between the fibers and the surrounding matrix, ensuring the bond therebetween remains weak, thereby improving the composite's mechanical properties (i.e., strength, toughness, etc.). These interfacial coatings can also protect the fibers from mechanical damage during handling and processing, and they may limit oxidation in the composite.

While boron carbide coatings have been utilized as interfacial fiber coatings for many applications, boron carbide coatings do not have the high temperature capability that boron nitride coatings do. As such, boron nitride coatings are more desirable for many applications, such as for divergent seals in gas turbine engines, which operate in aqueous environments at temperatures as high as about 1200° C.

While many methods exist for coating fibers with boron nitride, they all have drawbacks. Therefore, it would be desirable to have improved methods for coating fibers with boron nitride. It would also be desirable to have improved methods for removing the sizing from such fibers before applying the boron nitride coating thereon. It would be further desirable to have methods for nitriding the surface of the fibers before applying the boron nitride coating thereon, so as to prevent boron from diffusing into the fibers.

SUMMARY OF THE INVENTION

The above-identified shortcomings of existing boron nitride coating methods are overcome by embodiments of the present invention, which relates to improved boron nitride coatings and methods of applying such coatings. Fibers coated by methods of this invention may be utilized in various articles, such as, for example, in ceramic matrix composites that may be used in gas turbine engine components.

Embodiments of this invention comprise methods of coating fibers with boron nitride. These methods may comprise: providing a plurality of fibers; heating the fibers in an ammonia atmosphere; and contacting the fibers with a reaction mixture comprising a boron source and a nitrogen source at a temperature such that the boron source and the nitrogen source react with each other to produce a boron nitride coating on the fibers. The heating step may comprise heating a reactor up to about 260-1000° C. under a pressure of about 0-750 torr while ammonia gas is flowing in at a predetermined rate. The fibers may then be contacted with the reaction mixture at about 800-1000° C. and about 0-750 torr, while the reaction mixture is flowing in at a predetermined rate.

The fibers may comprise silicon carbide and/or silicon nitride. The fibers may be of any suitable form, such as, for example, fibers, monofilaments, fabrics, yarns, cloths, whiskers, bulk materials, etc. The boron source may comprise boron chloride, boron fluoride, or any other boron-containing material that produces boron nitride when reacted with ammonia. The nitrogen source may comprise ammonia.

Once coated, the fibers may be utilized in a ceramic matrix composite, such as one comprising silicon carbide, zirconium oxide, and/or mullite, etc. The ceramic matrix composite may comprise a plurality of boron nitride coated fibers encapsulated therein, wherein the boron nitride coating substantially covers each fiber. The ceramic matrix composite may be utilized in a gas turbine engine component, such as a divergent seal, a flap, a flame holder tail cone, and/or a sidewall liner, etc.

Further details of this invention will be apparent to those skilled in the art during the course of the following description.

DESCRIPTION OF THE DRAWINGS

Embodiments of this invention are described herein below with reference to various figures, wherein like characters of reference designate like parts throughout the drawings, in which.

DETAILED DESCRIPTION OF THE INVENTION

Figure 1:
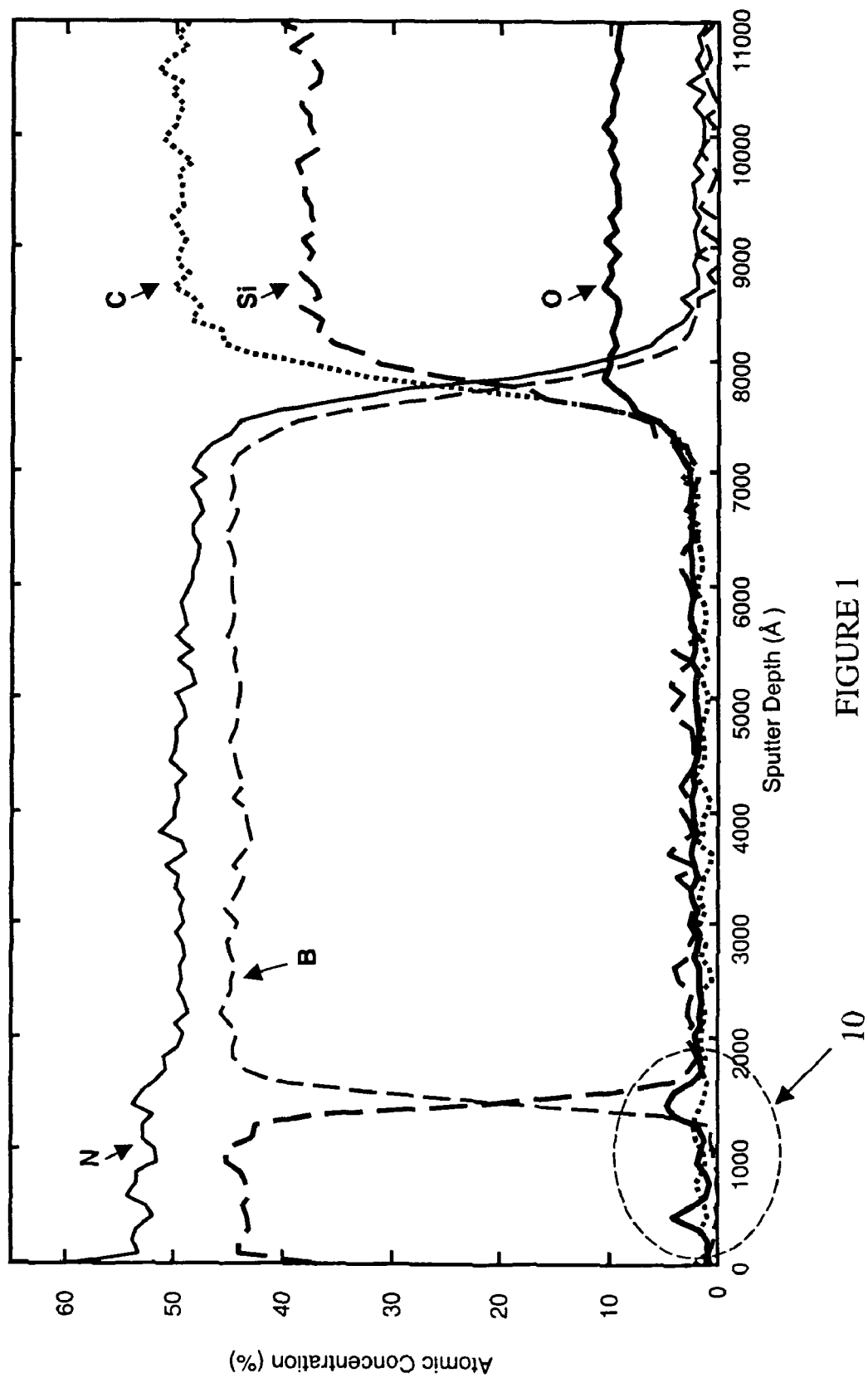
FIG. 1 is a scanning auger microscopy image of Nicalon™ fabric having a duplex coating thereon (one layer of BN and a second layer of $Si_3N_4$), desized via a standard $CO_2$ desizing process and coated with a standard ammonia coating process, showing large amounts of oxygen in the coating.
Figure 2:
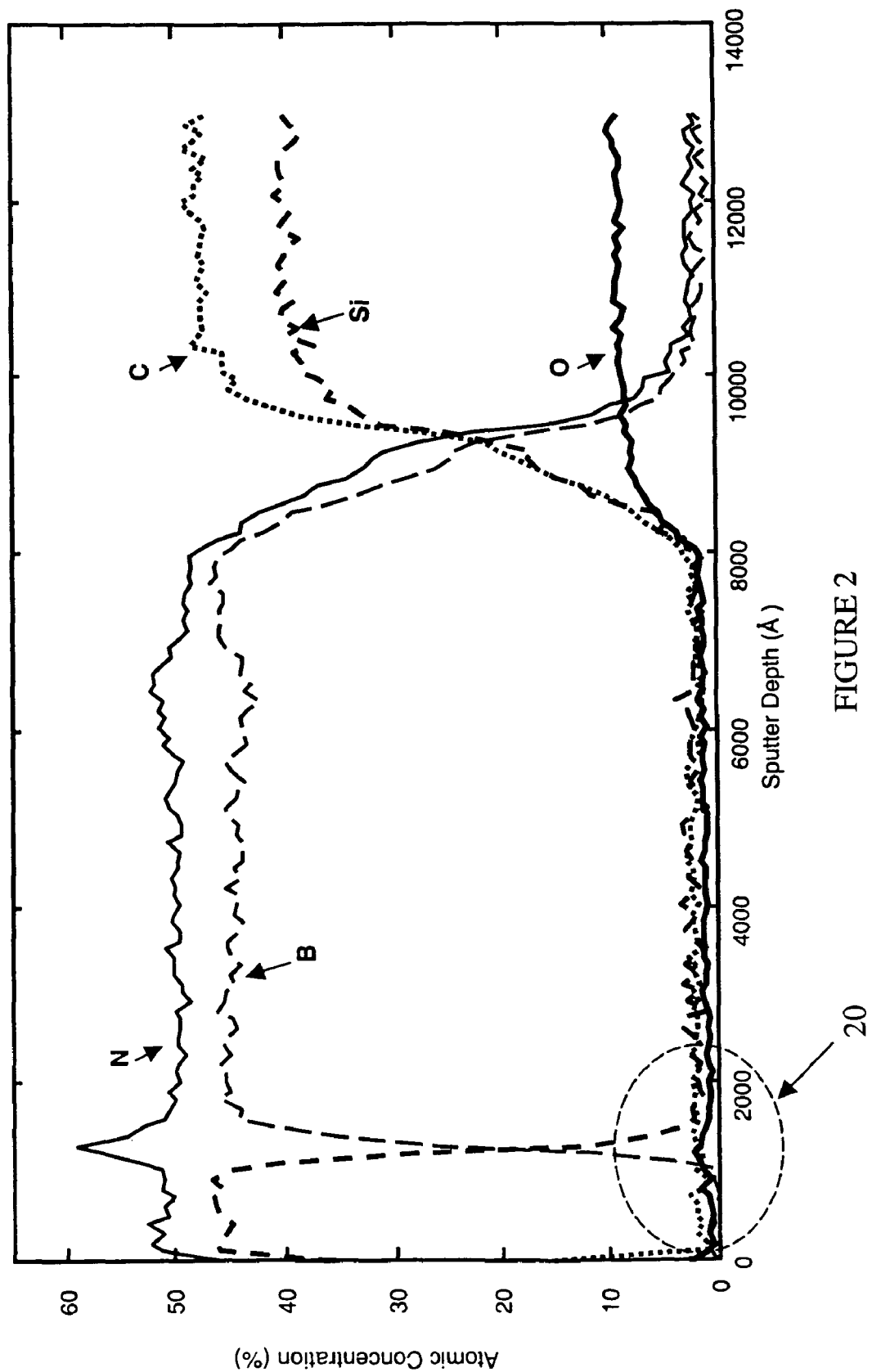
FIG. 2 is a scanning auger microscopy image of Nicalon™ fabric having a duplex coating thereon (one layer of BN and a second layer of $Si_3N_4$), desized and coated via a novel ammonia desizing/coating process of this invention, showing much lower amounts of oxygen in the coating than the coating of FIG. 1.

For the purposes of promoting an understanding of the invention, reference will now be made to some embodiments of this invention as illustrated in FIGS. 1-2 and specific language used to describe the same. The terminology used herein is for the purpose of description, not limitation. Specific structural and functional details disclosed herein are not to be interpreted as limiting, but merely as a basis for teaching one skilled in the art to variously employ the present invention. Any modifications or variations in the depicted structures and methods, and such further applications of the principles of the invention as illustrated herein, as would normally occur to one skilled in the art, are considered to be within the spirit and scope of this invention as described and claimed.

This invention relates to improved boron nitride coatings on fibers, particularly boron nitride coatings on silicon carbide fibers, and methods for applying such coatings. These coatings are easier to apply than existing boron nitride coatings, contain less oxygen than existing boron nitride coatings, and produce coated fibers that are superior to existing coated fibers.

Many commercially available fibers can be purchased from various manufacturers. Such fibers typically come from the manufacturer with a protective sizing thereon to protect the fibers during transit and handling. This sizing generally needs to be removed before an interfacial coating can be applied to the fibers so as to prevent carbon and oxygen from getting into the interfacial coating when it is applied. Once the sizing is removed, a boron nitride coating (and/or other coatings) may be applied to the fibers, and then the coated fibers may be utilized in a ceramic matrix composite.

Nicalon™ fabric (SiC fabric produced by Nippon Carbon Co., Tokyo, Japan) is one exemplary fibrous material that may be used in ceramic matrix composites. Nicalon™ fabric typically comes with a Type M (polyvinylacetate) sizing agent thereon to protect the fabric during handling thereof. The manufacturer recommends that the Nicalon™ fabric be heated in air at about 350° C. for about 30 minutes to remove the sizing. This heat treatment may produce an oxide film on the surface of the fibers, which may degrade the strength of the fibers and leave the fabric vulnerable to degradation during handling. Therefore, other methods of removing this sizing have been developed.

One method of removing this sizing involves utilizing a heat treatment in a carbon dioxide atmosphere at about 600-700° C. and about 1-3 torr for about 5-10 minutes. During this heat treatment, the carbon dioxide reacts with the carbon in the sizing to form carbon monoxide. Thereafter, the reactor is purged to evacuate the CO and $CO_2$ therein. Next, boron nitride may be deposited on the fibers by reacting a boron halide (i.e., boron chloride) with ammonia to form boron nitride as shown in the following reaction.

$$BCl_3(g)+NH_3(g) \rightarrow BN(s)+3HCl(g) \qquad (1)$$

This process has many drawbacks. First, residual CO and $CO_2$ may be left in the reactor after the reactor is purged, and/or the CO and $CO_2$ may chemically bond to the surface of the fibers in the fabric. In such cases, the CO and $CO_2$ may then become incorporated into the boron nitride coating when it is applied, which is undesirable. Furthermore, it was recently discovered that Nicalon™ fabric coated with boron nitride in this manner exhibited a loss in strength. Scanning auger microscopy (SAM) and transmission electron microscopy (TEM) indicated that a $SiO_2$ layer was present at the fiber/matrix interface in those composites that possessed low strength, while the $SiO_2$ layer was absent in those composites that possessed high strength. It was subsequently discovered that the oxygen that formed the $SiO_2$ layer came from the boron nitride coating process. It is believed that there are two possible sources of this oxygen. First, the oxygen in the boron nitride coating may have come from the $CO_2$ heat treatment that was used to remove the fiber sizing. Second, the oxygen in the boron nitride coating may have come from moisture that was adsorbed in the reactor.

When boron nitride is deposited in a chemical vapor deposition process at temperatures below about 1500° C., it is susceptible to degradation from exposure to moisture at room temperature. Such moisture degradation may occur in two steps. In the first step, boron nitride reacts with moisture at room temperature to form either boric acid as shown in reaction (2), or hydrated ammonium borate as shown in reaction (3).

$$BN(s)+3H_2O \rightarrow H_3BO_3(s)+NH^3(g) \qquad (2)$$

$$8BN(s)+10H_2O \rightarrow (NH_4)_2 \cdot 4B_2O_3 \cdot 6H_2O(s) \qquad (3)$$

It is also possible that the hydrated ammonium borate is an intermediate in the formation of boric acid. In the second step, the boric acid and/or hydrated ammonium borate is converted to boron oxide, ammonia and/or water as shown in reactions (4) and (5) respectively.

$$H_3BO_3(s) \rightarrow B_2O_3(s)+3H_2O(g) \qquad (4)$$

$$(NH_4)_2O \cdot 4B_2O_3 \cdot 6H_2O(s) \rightarrow 4B_2O_3(s)+7H_2O(g)+2NH_3(g) \qquad (5)$$

Thermodynamic calculations using the Gibbs free energy of formation equation show that the reaction shown in reaction (2) is favorable ($\Delta G=-19.8$ kcal at 25° C.), and the reaction shown in reaction (4) is also favorable ($\Delta G=-4.445$ kcal at 200° C.). However, this decomposition of boron nitride to boron oxide can create problems in the fabrication of subsequent coatings. First, the tooling that is used to handle the fabric/fibers being coated is repeatedly reused and exposed to air containing moisture when not in service in the reactor. This exposure causes the formation of hydrated ammonium borate, boric acid or a mixture of ammonium borate and boric acid, depending upon how long the tooling is exposed to the atmosphere when not in use. Second, when the reactor is disassembled to remove the coated fabric/fibers, air enters the chamber and contaminates the reactor. When new fabric/fibers are placed in the used tooling and the reactor is heated up to the deposition temperature for depositing boron nitride, the boron oxide (which has a melting point of about 450° C.) on the tooling and reactor walls melts and vaporizes, and reacts with the boron nitride that is being deposited onto the fabric/fibers. This is undesirable. Therefore, in order to prevent the boron oxide from volatizing and being deposited in the boron nitride coating, the boron oxide should be converted to an inert material. The most logical approach would be to convert the boron oxide back to boron nitride, as shown in reaction (6).

$$4B_2O_3(l)+2NH_3(g) \rightarrow 2BN(s)+3H_2O(g) \qquad (6)$$

Using thermodynamic calculations to determine the Gibbs free energy of formation for reaction (6), it can be determined that this reaction will occur at approximately 600° C. ($\Delta G=-0.418$ kcal at 600° C. and $\Delta G=-3.127$ kcal at 700° C.). Therefore, by heating up the fabric/fibers to the desired deposition temperature (i.e., above about 600° C.) in ammonia, the formation of volatile boron oxide should be prevented, thereby resulting in stronger coated fabrics/fibers.

While attempting to solve this oxygen problem, it was unexpectedly discovered that Nicalon™ fabric could be heat treated and de-sized in an ammonia-containing atmosphere, and then be coated with boron nitride, without requiring a separate purge step in between the two processes, thereby eliminating both sources of oxygen discussed above. This invention not only reduces the number of processing steps required, but also produces fibers that have less oxygen/moisture thereon, and nitrides the surfaces of the fibers to prevent boron from diffusing therein.

It is believed that the ammonia gas removes the sizing by reacting with the carbon in the sizing as shown in reaction (7).

$$4NH_3(g)+3C(s) \rightarrow 3CH_4(g)+2N_2(g) \qquad (7)$$

The sizing on such fibers can be removed by heating the reactor up to about 260-1000° C. under a pressure of about 0-750 torr while flowing in $NH_3$ gas at any suitable rate, then passing the fibers through the hot zone at least one time at a rate of about 0.1-1.0 feet/minute, depending upon the furnace temperature. In embodiments, the reactor may be heated up to about 600° C., the $NH_3$ gas may be flowing in at a rate of about 300 sccm, and the fibers may be passed through the hot zone at a rate of about 1 foot/minute, to remove the sizing. Alternatively, the fabric could also be placed in a furnace and the furnace could be brought up to the deposition temperature while flowing in $NH_3$ gas. In addition to removing the sizing, utilizing ammonia in this manner also nitrides the surface of the fibers in the fabric, which can then prevent boron from diffusing into the fibers when a boron nitride interfacial coating is applied thereon. By nitriding the surface of the fibers, boron atoms deposited on the surface of the fibers during deposition are much more likely to interact with a nitrogen atom rather than diffuse into the fibers. This is desirable because boron diffusing into the fibers degrades the strength of the fibers. Once the sizing is removed, and without purging the reactor, boron nitride may then be deposited on the fibers by reacting a boron halide, such as boron chloride, with ammonia, as shown in reaction (1) above. The boron nitride may be deposited by heating the reactor up to about 800-1000° C. under a pressure of about 0-750 torr while a boron halide gas and $NH_3$ gas are flowing in at suitable rates (i.e., at a ratio of about 1:1 or excess $NH_3$), then passing the fibers through the hot zone at least one time. In embodiments, excess $NH_3$ may be desired so that $NH_3Cl$ is produced instead of HCl.

In order to confirm the effectiveness of this invention, various samples of Nicalon™ fabric were coated and evaluated. First, a reference sample was created. In this sample, the polymer-based protective sizing (i.e., polyvinylacetate) was removed from the Nicalon™ fabric by heating the reactor up to about 850° C. under a pressure of about 1-2 torr while $CO_2$ gas was flowing in at a rate of about 300 standard $cm^3$/minute (sccm), then passing the fabric through the hot zone one time at a rate of about 1 foot/minute. Thereafter, the reactor was purged to evacuate the CO and $CO_2$ therein. Next, as shown in reaction (1), boron nitride (about 0.2-0.3 μm thick) was deposited on the fabric by reacting boron chloride with ammonia via chemical vapor deposition at a temperature of about 950° C. and a pressure of about 1 torr as the fabric was passed through the hot zone about eight times at a rate of about 1 foot/minute. In embodiments, this reaction may occur at about 800-1000° C. because below about 700° C., the boron nitride coating may contain impurities, such as trapped chlorides, depending upon the deposition rate and pressure. Thereafter, a layer of $Si_3N_4$ about 0.1-0.2 μm thick was deposited on top of the BN layer by reacting ammonia with $SiCl_4$ via chemical vapor deposition at a temperature of about 950° C. and a pressure of about 0.5-1 torr as the fabric was passed through the hot zone about 10 times at a rate of about 1-1½ feet/minute. This $Si_3N_4$ layer provides environmental/oxidation protection to the boron nitride coated fiber/fabric.

Next, a test sample was created according to an embodiment of this invention. In this sample, Nicalon™ fabric was desized and coated in a single process (without purging the reactor between steps). In this sample, the reactor was first heated up to about 850° C. under a pressure of about 1-2 torr while ammonia gas was flowing in at a rate of about 300 sccm. Thereafter, the Nicalon™ fabric was passed through the hot zone one time at a rate of about 1 foot/minute to desize the fabric. As previously noted, it is believed that the ammonia gas removed the sizing by reacting with the carbon in the sizing as shown in reaction (7) above. After this heat treatment, and without purging the reactor, boron nitride was then deposited on the fabric via chemical vapor deposition by reacting boron chloride with ammonia as shown in reaction (1) above, at a temperature of about 900° C. and a pressure of about 1 torr while the boron chloride and ammonia were flowing in at a ratio of about 1:4 to about 1:5 respectively (i.e., a rate of about 350 sccm and 2500 sccm respectively), and the fabric was passed through the hot zone several times at a rate of about 1 foot/minute until the desired thickness (about 0.2-0.3 μm) of BN was deposited. Thereafter, the boron chloride was turned off and $SiCl_4$ was turned on to flow in at a rate of about 350 sccm so that a layer (about 0.1-0.2 μm thick) of $Si_3N_4$ was deposited on top of the boron nitride layer. In this test sample, the deposition chamber was not evacuated before the boron nitride and silicon nitride coatings were applied. The sizing was removed and the coatings were applied in one single processing step.

The samples were then compared utilizing scanning auger microscopy (SAM) and tensile strength data. FIG. 1 is a SAM image of the reference sample showing large amounts of oxygen (about 2-3%) 10 in the coating. FIG. 2 is a SAM image of the test sample showing only trace amounts of oxygen 20 in the coating. Additionally, the tensile strength of the test sample was about 8% greater than that of the reference sample.

While chemical vapor deposition was described above, these boron nitride coatings may be deposited on the fibers in any suitable manner, such as, for example, via chemical vapor deposition and/or chemical vapor infiltration.

The boron nitride coatings should be deposited on the fibers so that at least no significant portion of the fibers is left uncoated. Preferably, all surfaces of the fibers are entirely coated. This coating should be continuous and uniform and be free of any significant porosity. This coating can be of any suitable thickness, and in some embodiments, may be about 0.1-0.5 μm thick.

Any source of boron nitride may be used in this invention, such as, for example, boron tri-chloride and ammonia; or boron tri-fluoride and ammonia; or any other boron source that reacts with ammonia to form boron nitride.

The boron nitride coatings of this invention may be applied to various materials that may be used as reinforcing phases in ceramic or glass matrix composites. These coatings are compatible with most conventional fibers and materials, such as, for example, Nicalon™ SiC fabric or other SiC fibers, Tyranno SiC fibers (made by UBE), $Si_3N_4$ fibers, etc. These fibers may be in any suitable form, such as, for example, in the form of fibers, fabrics, yarns, monofilaments, cloths, whiskers, etc. These coatings may also be applied to other substrates, such as, for example, bulk SiC, etc.

After the fibers are coated with the coatings of this invention, the fibers may be embedded in a ceramic or glass matrix to make a composite. Any matrix compatible with the fibers may be used. Some suitable matrices include, but are not limited to, SiC, chemical vapor deposited SiC, melt infiltrated SiC composites, polymer infiltrated composites, and sol-gel infiltrated composites.

As described above, this invention provides methods for coating various fibrous materials with boron nitride. Advantageously, this invention allows the de-sizing and coating operations to be combined into one processing step, thereby reducing manufacturing costs and the possibility of contamination. Many other embodiments and advantages will be apparent to those skilled in the relevant art.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A method of coating fibers with boron nitride, comprising:
removing a sizing on a plurality of fibers by heating the plurality of fibers in an ammonia atmosphere in a reactor, and
after the removing, contacting the fibers with a reaction mixture comprising a boron source and a nitrogen source such that the boron source and the nitrogen source react with each other to produce a boron nitride coating on the fibers, the boron nitride coating being substantially free of oxygen except in up to trace amounts.

2. The method of claim 1, wherein the fibers comprise at least one of: silicon carbide and silicon nitride.

3. The method of claim 1, wherein the fibers comprise at least one of: a fiber, a monofilament, a fabric, a yarn, a cloth, a whisker, and a bulk material.

4. The method of claim 1, wherein the removing step occurs under a pressure of about 0.750 torr while ammonia gas is flowing in at a predetermined rate.

5. The method of claim 1, wherein the reaction mixture is flowing in at a predetermined rate.

6. The method of claim 1, wherein the boron source comprises at least one of: boron chloride, boron fluoride, and a boron-containing material that produces boron nitride when reacted with ammonia.

7. The method of claim 1, wherein the nitrogen source comprises ammonia.

8. The method of claim 1, further comprising:
utilizing the coated fibers in a ceramic matrix composite.

9. The method of claim 8, wherein the ceramic matrix composite comprises at least one of: silicon carbide, zirconium oxide, and mullite.

10. The method of claim 8, wherein the ceramic matrix composite comprises a gas turbine engine component.

11. The method of claim 10, wherein the gas turbine engine component comprises at least one of the following nozzle components: a divergent seal, a flap, a flame holder tail cone, and a sidewall liner.

12. The method of claim 1, further comprising nitriding the surfaces of the plurality of fibers prior to contacting the fibers with the reaction mixture.

13. The method of claim 1, wherein the sizing is a polymer.

14. The method of claim 1, wherein the sizing is polyvinyl acetate.

15. The method of claim 1, including removing the sizing in the ammonia atmosphere and contacting the fibers with the reaction mixture without purging the reactor between the removing and the contacting.

16. The method claim 1, further including a silicon nitride layer on the boron nitride coating.

17. A method of coating silicon carbide fibers with boron nitride, comprising:
removing a sizing on a plurality of silicon carbide fibers by heating the plurality of silicon carbide fibers in ammonia gas in a reactor up to about 260-1000° C. at about 0.750 torr while ammonia gas is flowing in at a predetermined rate;
after the removing, contacting the plurality of silicon carbide fibers with a reaction mixture at about 800-1000° C. and about 0-750 torr, wherein the reaction mixture comprises boron chloride and ammonia flowing in at predetermined rates, to produce a boron nitride coating on the plurality of silicon carbide fibers, the boron nitride coating being substantially free of oxygen except in up to trace amounts.

18. A method of coating silicon carbide fibers with boron nitride, comprising:
removing a sizing on a plurality of silicon carbide fibers by heating the plurality of silicon carbide fibers in ammonia gas in a reactor up to about 850° C. at about 1-2 torr while ammonia gas is flowing in at a rate of about 300 sccm;
after the removing, contacting the plurality of silicon carbide fibers with a reaction mixture at about 900° C. and about 1 torr, wherein the reaction mixture comprises boron chloride and ammonia flowing in at a ratio of about 1:4 to 1:5 respectively, to produce a boron nitride coating on the plurality of silicon carbide fibers, the boron nitride coating being substantially free of oxygen except in up to trace amounts.

19. The method of claim 18, herein the boron chloride is flowing in at a rate of about 350 sccm and the ammonia is flowing in at a rate of about 2500 sccm.

20. The method of claim 18, further comprising:
depositing a layer of silicon nitride onto the boron nitride coating.

21. The method of claim 20, wherein the silicon nitride is deposited at about 900° C. and about 1 torr by reacting silicon chloride flowing in at a rate of about 350 sccm with ammonia flowing in at a rate of about 2500 sccm.

* * * * *